United States Patent
Oda et al.

(10) Patent No.: US 7,432,962 B2
(45) Date of Patent: Oct. 7, 2008

(54) DYNAMIC RANGE BROADENING METHOD FOR A SOLID-STATE IMAGE SENSOR INCLUDING PHOTOSENSITIVE CELLS EACH HAVING A MAIN AND A SUBREGION

(75) Inventors: Kazuya Oda, Asaka (JP); Hirokazu Kobayashi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1211 days.

(21) Appl. No.: 10/671,802

(22) Filed: Sep. 29, 2003

(65) Prior Publication Data

US 2005/0099508 A1 May 12, 2005

(30) Foreign Application Priority Data

Sep. 30, 2002 (JP) ............... 2002-285852

(51) Int. Cl.
 H04N 5/235 (2006.01)
 H04N 5/335 (2006.01)
(52) U.S. Cl. .................... 348/229.1; 348/315
(58) Field of Classification Search ............. 348/222.1, 348/223.1, 225, 241, 229.1, 297, 315, 316, 348/317
 See application file for complete search history.

(56) References Cited

U.S. PATENT DOCUMENTS

| 6,219,097 B1 * | 4/2001 | Kamishima et al. ......... 348/297 |
| 6,236,434 B1 | 5/2001 | Yamada |
| 6,677,992 B1 * | 1/2004 | Matsumoto et al. ...... 348/229.1 |
| 7,190,403 B2 * | 3/2007 | Yamashita et al. .......... 348/364 |
| 7,239,352 B2 * | 7/2007 | Oda et al. .................... 348/364 |
| 2002/0057903 A1 | 5/2002 | Kubo |

FOREIGN PATENT DOCUMENTS

| JP | 09-205589 | * | 8/1997 |
| JP | 2001-8092 A | | 1/2001 |
| JP | 2001-8104 A | | 1/2001 |
| JP | 2001-78095 A | | 3/2001 |
| JP | 2002-84453 A | | 3/2002 |

OTHER PUBLICATIONS

Takemura, "Introduction to CCD Camera Technologies," pp. 100-102 (1997) (discussed at pp. 1 to 2 of the specification).

* cited by examiner

Primary Examiner—Tuan Ho
Assistant Examiner—Trung Diep
(74) Attorney, Agent, or Firm—Birch, Stewart, Kolasch & Birch, LLP (57) ABSTRACT

A method of broadening a dynamic range is applied to a solid-state image sensor of the type including photodiodes each being divided into a main and a subregion different in photosensitivity from each other. While the quantity of light to be incident on a photodiode is reduced, a signal charge is read out only from the main region of the photodiode. The signal charge is digitized and then written to two image memories. Digital signals thus stored in the image memories are respectively amplified by white balance gain circuits with different gains. The resulting digital signals are combined by an image synthesizer. The method can therefore broaden the dynamic range of the image sensor by using only the main regions of the photodiodes.

4 Claims, 11 Drawing Sheets

DYNAMIC RANGE BROADENING METHOD FOR A SOLID-STATE IMAGE SENSOR INCLUDING PHOTOSENSITIVE CELLS EACH HAVING A MAIN AND A SUBREGION

This Nonprovisional application claims priority under 35 U.S.C. § 119(a) on Patent Application No(s). 2002-285852 filed in Japan on Sep. 30, 2002, the entire contents of which are hereby incorporated by reference.

BACKGROUND OF THE INVENTION

1. Field of the Invention

The present invention relates to a method of broadening the dynamic range of a solid-state image sensor included in a digital still camera or similar image pickup apparatus.

2. Description of the Background Art

It is a common practice with a CCD (Charge Coupled Device) image sensor or similar solid-state image sensor to broaden a dynamic range by preparing two different images produced by photosensitive cells different in photosensitivity from each other. An image derived from high-sensitivity photosensitive cells appear relatively clear even when a subject is relatively dark, because those cells respond even to a small amount of incident light. However, if lightness of a desired subject exceeds preselected luminance, then the high-sensitivity photosensitive cells are saturated and render the image white and unclear. On the other hand, an image derived from low-sensitivity photosensitive cells render even a light subject, which would cause the high-sensitivity cells to be saturated, clear although rendering a dark subject even darker and unclear. Therefore, by combining the two images each having a particular advantage as stated above, it is possible to broaden the dynamic range for rendering any kind of subject clear regardless of the luminance distribution of a scene. This kind of scheme is taught in, e.g. Hiroo Takemura "Introduction to CCD Camera Technologies", First Edition, CORONA PUBLISHING CO., LTD., Dec. 1997, pp. 100-102.

However, it has been customary with the solid-state image sensor of the type having partitioned photosensitive cells, each having a main region and a subregion. According to this type of image sensor, signal charges are read out sequentially from the main regions and then from the subregions, taking a period of time corresponding to two fields of image.

SUMMARY OF THE INVENTION

It is an object of the present invention to provide a dynamic range broadening method for a solid-state image sensor of the type having partitioned photosensitive cells, which is capable of broadening the dynamic range while efficiently reading out signal charges.

A dynamic range broadening method of the present invention is applied to a solid-state image sensor of the type including photosensitive cells, each being made up of a main and a subregion respectively provided with relatively higher and relatively lower optical sensitivity, and allowing signal charges to be read out from the main and subregions separately. The method comprises the steps of reducing the quantity of light to be incident on a photosensitive cell, reading out a signal charge from the main region of the photosensitive cell under the reduced quantity of incident light, digitizing the signal charge, storing the resulting digital signal in two memories, amplifying the digital signals stored in the memories by use of two different gains, and combining the resulting signals differently amplified. Consequently, the dynamic range of the image sensor can be broadened by use only of the main regions of the photosensitive cells.

BRIEF DESCRIPTION OF THE DRAWINGS

The objects and features of the present invention will become more apparent from consideration of the following detailed description taken in conjunction with the accompanying drawings in which:

FIG. 1 shows how FIGS. 1A and 1B are combined;

FIGS. 1A and 1B, when combined as shown in FIG. 1, are schematic block diagrams showing a digital still camera for practicing a dynamic range broadening method embodying the present invention and including a signal processor shown in FIGS. 5A and 5B;

FIG. 5 shows how FIGS. 5A and 5B are combined;

DESCRIPTION OF THE PREFERRED EMBODIMENT

A method of broadening the dynamic range of a solid-state image sensor embodying the present invention will be described hereinafter with reference to the accompanying drawings. It is to be noted that parts and elements not directly relevant to the understanding of the present invention are not shown in the figures and that identical parts and elements are designated by identical reference numerals. Signals are designated by reference numerals attached to signal lines on which they appear.

Figures 1, 1A:
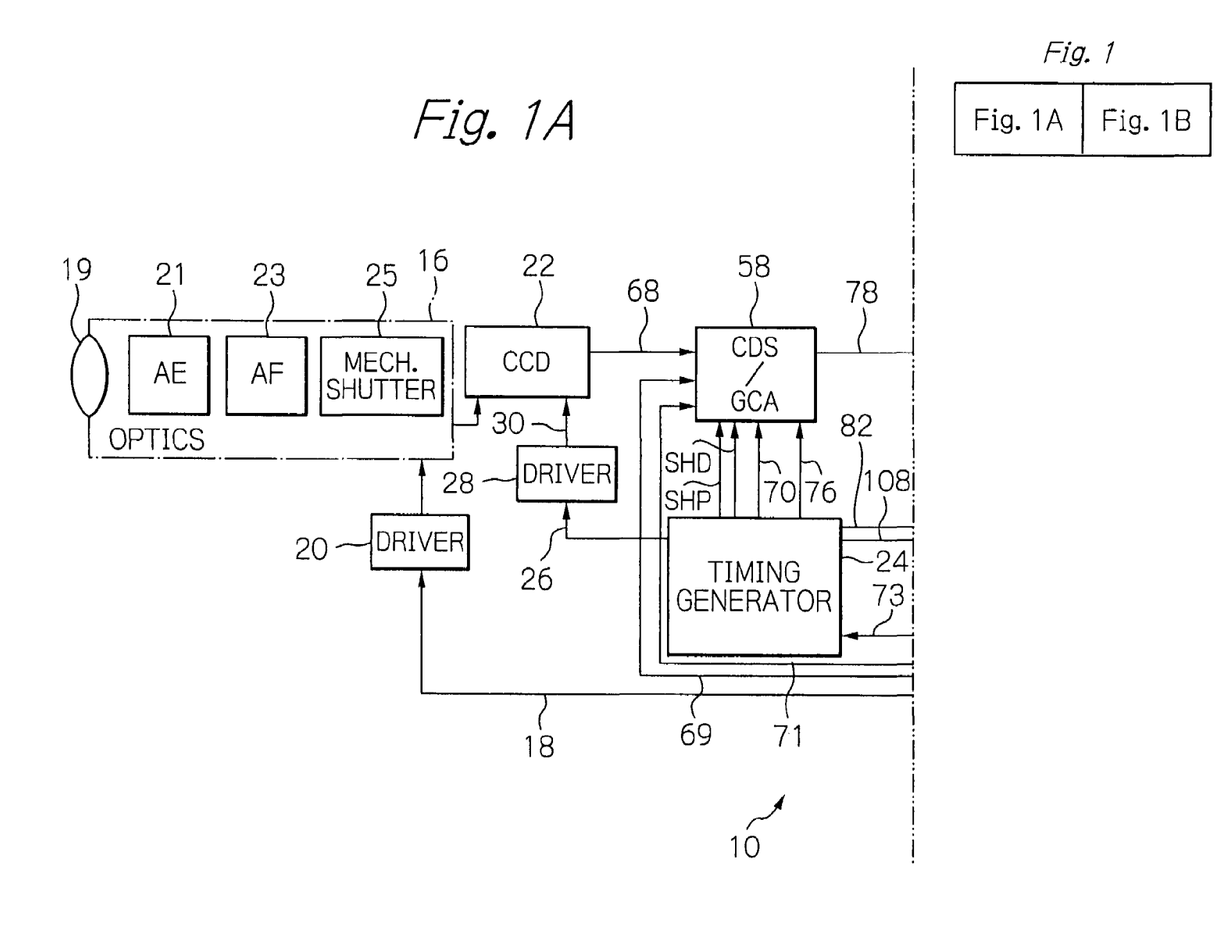
Figure 1B:
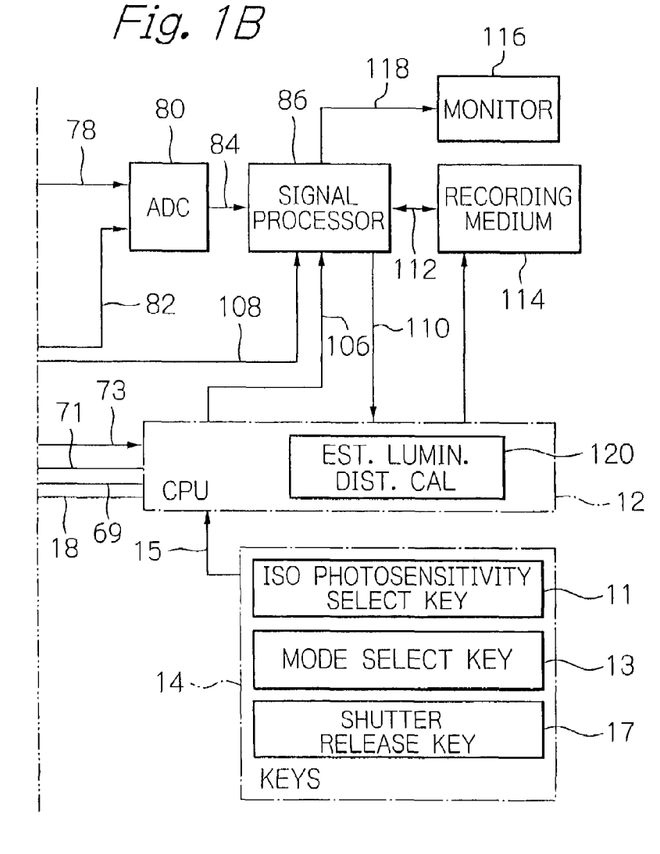

FIGS. 1A and 1B are schematic block diagrams showing a digital still camera to which the illustrative embodiment is applied. As shown, the digital still camera, generally 10, includes a CPU (Central Processing Unit) 12 configured to control the entire camera 10 in response to signals 15 fed from keys 14 representative of the operator's manipulation.

The keys 14 include an ISO (International Standards Organization) photosensitivity select key 11, a mode select key 13, and a shutter release key 17. The ISO photosensitivity select key 11 allows the operator to select photosensitivity corresponding to any one of ISO 100, 200 and 400, as desired. The mode select key 13 allows the operator to select either one of camera modes, a still picture mode or a movie mode available with the digital camera 10. The signals 15 representative of the photosensitivity and a mode thus selected are fed to the CPU 12. The shutter release key 17 is depressed in two strokes stepwise, i.e. in a first stroke S1 for establishing a preliminary photometry stage and then in a second stroke S2 for establishing an actual image pickup stage. When the shutter release key 17 is depressed in the second stroke S2, a trigger signal 15 is fed from the shutter release key 17 to the CPU 12.

The camera 10 includes optics 16, which includes a lens 19, an AE (Automatic Exposure) mechanism 21, an AF (Automatic Focus) mechanism 23 and a mechanical (MECH) shutter 25, which are driven by a driver 20 to which an optics control signal 18 is delivered from the CPU 12.

The camera 10 also includes a CCD image sensor 22, which is a specific form of a solid-state image sensor, and includes a plurality of photodiodes or photosensitive cells arranged in a particular array to be described later. A driver 28 drives the CCD image sensor 22 in response to timing signals 26 fed from a timing signal generator 24, which is also controlled by the CPU 12. The timing signals 26 include a horizontal and a vertical synchronizing signal and timing pulses for an electronic shutter. More specifically, the driver 28 feeds a horizontal and a vertical transfer signal, an electronic shutter signal and an OFD (OverFlow Drain) drive signal 30 to the image sensor 22 in response to the timing signals 26.

Figure 2:
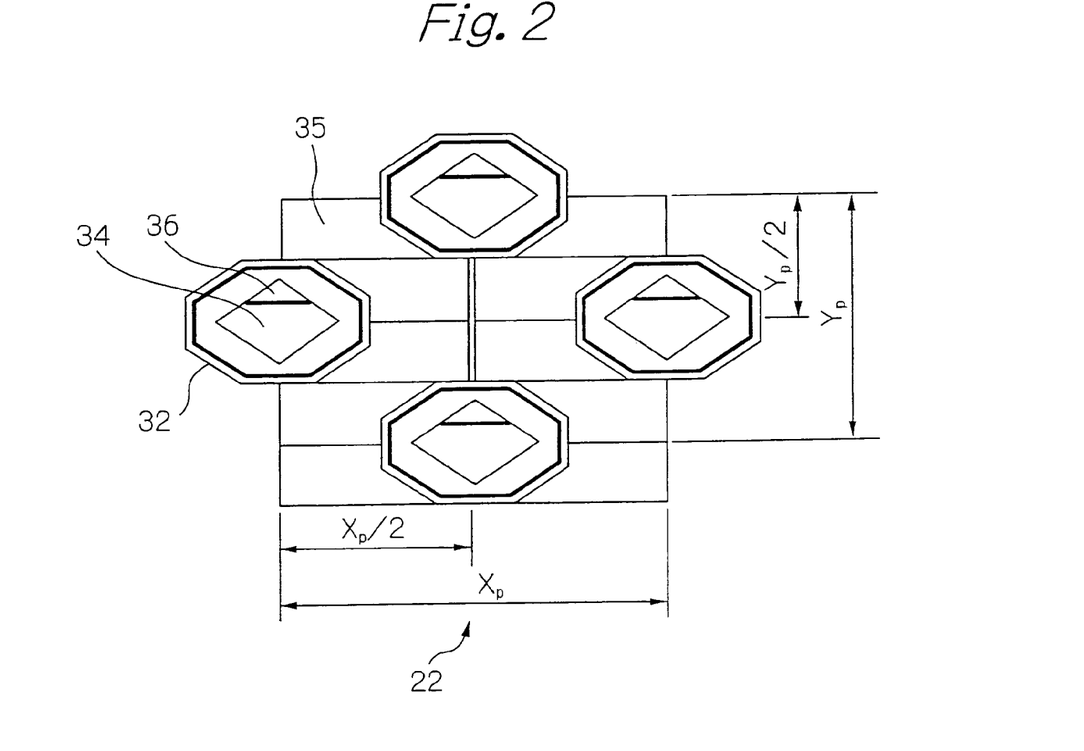
FIG. 2 is a fragmentary plan view showing part of a CCD image sensor included in the camera of FIG. 1.

FIG. 2 shows part of photodiodes 32 arranged in the image sensor 22. As shown, each photodiode 32 has a photosensitive area divided into a main region 34 having a relatively larger area and higher optical sensitivity and a subregion 36 having a relatively smaller area and lower optical sensitivity. In the illustrative embodiment, the photodiodes 32 are arranged at a pixel pitch of $X_P$ in the direction of row and at a pixel pitch of $Y_p$ in the direction of column. Further, each of the photodiodes 32 surrounding a given photodiode 32 is spaced from the given photodiode 32 by pixel pitches of $X_p/2$ and $Y_p/2$. Let this pattern be referred to as a pixel shift pattern. The pixel shift pattern realizes dense arrangement of the photodiodes 32. Vertical transfer registers 35 are formed between nearby photodiodes 32 and extend zigzag, skirting round the photodiodes 32. Signal charges can be read out from the main and subregions 34 and 36 separately and transferred via the vertical transfer registers 35.

It should be noted that the present invention is applicable not only to the solid-state image sensor using the pixel shift pattern but also to a conventional solid-state image sensor in which photosensitive cells are arranged in, e.g. a lattice pattern.

Figure 3:
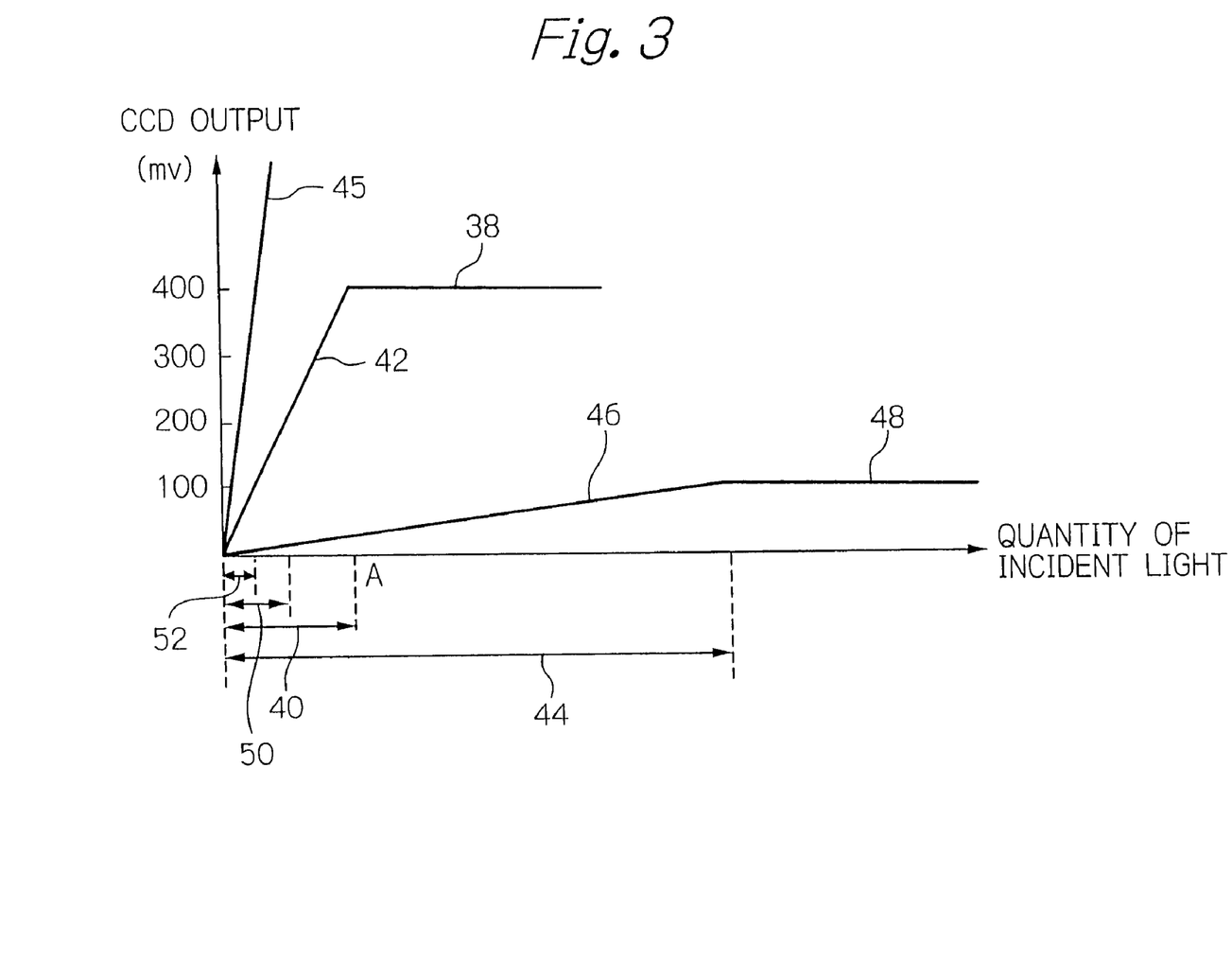
FIG. 3 is a graph plotting the photoelectric transduction characteristics of a photodiode included in the CCD image sensor of FIG. 2.

FIG. 3 is a graph plotting the photoelectric transduction characteristics of a photodiode 32. The main region 34 of the photodiode 32 may have photosensitivity corresponding to any one of ISO 400, 200 and 100 in order of sensitiveness. When the photosensitivity of the main region 34 is selected to be ISO 100, the output voltage of the main region 34 increases as plotted on a line 42 within a luminance range represented by a main pixel reproducible range 40 and then saturates the main region 34 at a level 38, i.e. 400 mV. It is to be noted that a term "reproducible range" refers to the range of the quantity of incident light in which a voltage output from the main or the subregion 34 or 36 in response to incident light can have an effective value.

Assume that the subregion 36 is provided with photoelectric transduction characteristics including photosensitivity and saturation level that are respectively one-sixteenth and one-fourth, compared to the characteristics of the main region 34 stated above. Then, the output voltage of the subregion 36 increases as plotted on a line 46 within a luminance range represented by a subpixel reproducible range 44 and then saturates the subregion 36 at a level 48, i.e. 100 mV.

As FIG. 3 indicates, the subpixel reproducible range 44 is four times as broad as the main pixel reproducible range 40. The subregion 36 therefore has a dynamic range, which is the maximum range of lightness reproducible as an image, four times as broad as the dynamic range of the main region 34. It follows that assuming that luminance information available with the main region is 100%, then the subregion can produce 400% luminance information.

As exemplified by the numerical value 400%, the performance of a photodiode divided into a main and a subregion is generally represented by the ratio of the reproducible range of the subregion to that of the main region. Such a numerical value stand for the maximum luminance difference of a scene that the photodiode can deal with in reproducing the scene.

The selected photosensitivity ISO 200 or 400 of the main region 34 is achieved as follows. First, a shutter speed or an F number is varied. To vary the shutter speed, on receiving a signal 15 from the ISO photosensitivity select key 11, the CPU 12 delivers a control signal 18 to the driver 20 to thereby vary the closing time of the mechanical shutter 25 or operates the driver 28 via the timing signal generator 24 in order to adjust an electronic shutter signal 30 meant for the image sensor 22. For example, a shutter speed of ⅟60 second assigned to ISO 100 is varied, due to the photosensitivity selection, to ⅟120 second assigned to ISO 200 or ⅟240 second assigned to ISO 400 for thereby halving or quartering the quantity of light to be incident on the photodiode 32. Accordingly, luminance information distributed in the main pixel reproducible range 40 under the original photosensitivity ISO 100 is distributed in a reproducible range 50 when ISO 200 is selected or in a reproducible range 52 when ISO 400 is selected, which is one-half or one-fourth of the range 40. Subsequently, the resulting output value may be doubly or quadruply amplified by GCAs (Gain-Controlled Amplifiers) 62 and 64 (see FIG. 4) or WB (White Balance) gain circuits 92*a* and 92*b* (see FIG. 5A), which will be described specifically later.

In FIG. 3, a line 45 shows specific output values quadruply amplified with gain when ISO 400 is selected as the photosensitivity of the main region 34. As stated above, to set the photosensitivity of the digital camera 10, the quantity of incident light is reduced to limit a reproducible range, and then the resulting output is electrically amplified depending on the selected photosensitivity.

As FIG. 3 indicates, assuming that photosensitivity ISO 200 is selected on the digital camera 10, then the reproducible range 50 actually used by the main region 34 is one-half of the reproducible range 40 available when the photosensitivity ISO 100 is selected. Therefore, the reproducible range 44 of the subregion 36 contains 800% luminance information, compared to the reproducible range 50 of the main region 34. Further, if ISO 400 is selected as the photosensitivity of the digital camera 10, then the reproducible range of the subregion 36 is 1,600% broader than the reproducible range 52 of the main region 34.

In practice, however, a scene is extremely rare in which luminance differs tenfold. On the other hand, when e.g. ISO 400 is selected as the photosensitivity of the main region 34, luminance values, which would in the case of ISO 100 be distributed in the ranges 40 and 44 shown in FIG. 3, are distributed in the ranges 52 and 40, respectively. This is because the quantity of incident light is reduced.

As stated above, although the lines 45 and 42 differently amplified under ISO 400 seem to have the reproducible ranges 52 and 40 respectively, they actually respond to quantities of light lying in the reproducible ranges 40 and 44 in the case of ISO 100, respectively. In other words, the output values of lines 45 and 42 derived only from the main region 34 with the photosensitivity ISO 400 corresponds to the output values of lines 42 and 46 derived from the main and subregions 34 and 36 with the photosensitivity ISO 100 i.e. on the condition that the quantity of light is not reduced. Why such a correspondence is achievable is that the method of broadening the dynamic range available under ISO 100, combining two kinds of output value derived from high-sensitivity main region 34 for the range 40 small in the quantity of incident light and from the low-sensitivity subregion 36 for the range 44 large in the quantity of incident light, can be implemented also under ISO 400 by using the output values 45 and 42 both derived from the main region 34 and each being amplified with different gains. In this case the reproducible range 40 contains 400% more luminance information than the reproducible range 52, allowing the dynamic range to be broadened to 400%. Such a dynamic range is equivalent to the dynamic range achievable when photosensitivity ISO 100 is selected on the digital camera 10 and both the main and subregions 34 and 36 are used.

Because a scene with such a noticeable luminance difference can be picked up only by the main region 34 under ISO 400, it is not rare that the whole of luminance of a scene can be reproduced at levels below the saturation level 38 of the main region 34 without resorting to information derived from the subregion 36. More specifically, under ISO 400, it may often be unnecessary to read out image data from the subregion 36.

Whether or not a given scene can be reproduced is not determined by the absolute luminance value of the scene, but by the distribution of luminance values, i.e. relative scattering. Therefore, if most of a scene has luminance values comparable with the highest luminance value, the scene can be easily reproduced regardless of the absolute highest luminance value, because the distribution of the luminance values is small. Then, when a scene with the maximum luminance difference of four times or so can be picked up with ISO 100 by using the information derived from both the main and subregion 34 and 36, such 400% pickup is also achievable even with ISO 400 by using the information derived only from the main region 34.

As stated above, under a higher optical sensitivity, it is often possible to sufficiently reproduce a scene even by the information derived only from the main region 34. Also, when a scene can be so reproduced within the main pixel reproducible range 40, signal charges may be read out not only from the main region 34 but also from the subregions 36 and mixed together. In such a case, because the output voltage and therefore photosensitivity increases and because a gain to be used later can be reduced, it is possible to achieve a picture with a high S/N (Signal-to-Noise) ratio and containing less noise.

Figure 4:
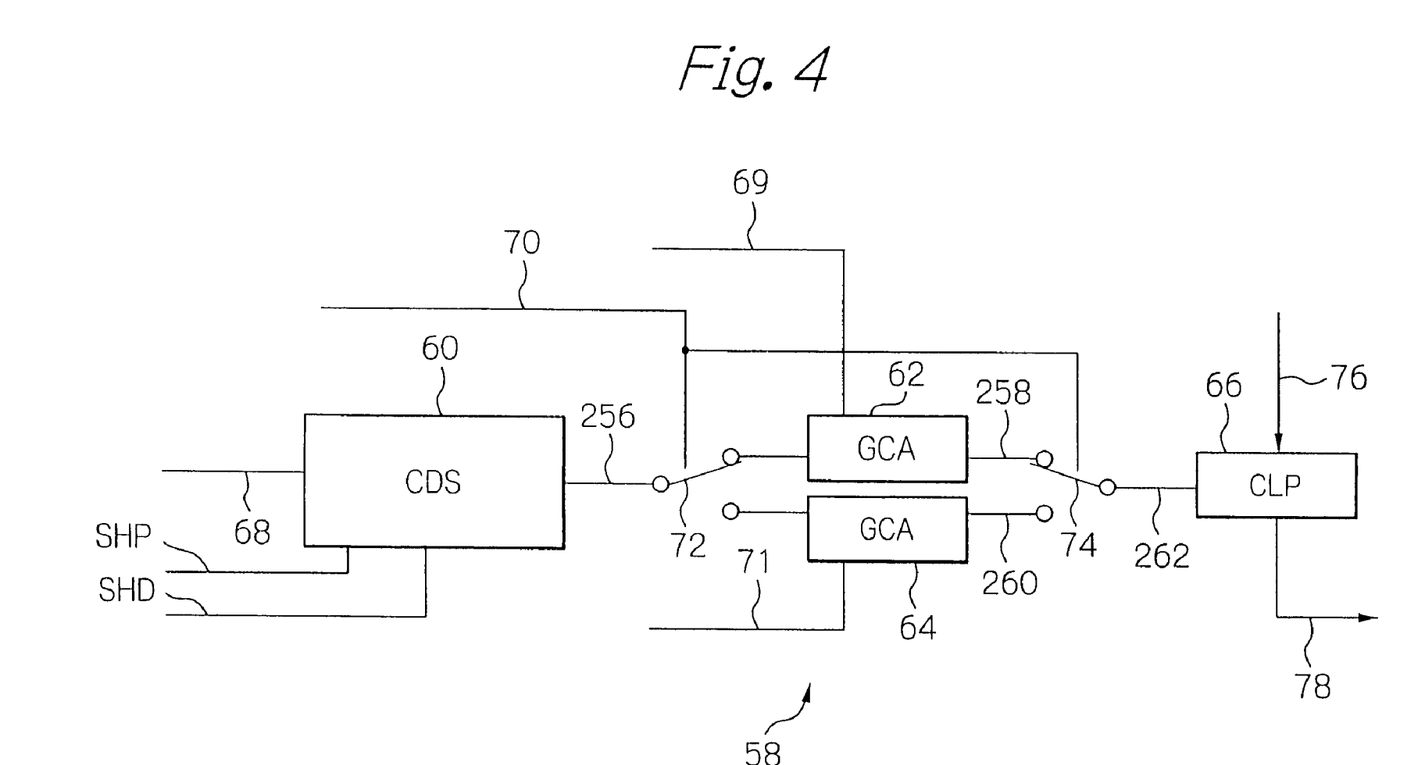
FIG. 4 is a schematic block diagram showing a specific configuration of a CDS/GCA (Correlated Double Sampling/Gain-Controlled Amplifier) included in the camera of FIG. 1.

FIG. 4 shows a CDS/GCA (Correlated Double Sampling/Gain-Controlled Amplifier) 58 included in the circuitry of FIG. 1A in detail. As shown, the CDS/GCA 58 includes a CDS circuit 60, GCAs 62 and 64, and a damper (CLP) 66. On receiving data 68 output from the CCD 22, the CDS 60 double-samples a field-through level 252 and a signal level 254 (see FIG. 9A) included in the CCD output waveform and reduces noise by using the fact that noises contained in the levels 252 and 254 are correlated. The CDS 60 clamps the field-through level 252 in response to sampling pulses SHP (Sample and Hold Pedestal) output from the timing generator 24. Also, the CDS 60 samples and holds the actual signal level 254 in response to sampling pulses SHD (Sample and Hold Data) also output from the timing generator 24.

The GCAs 62 and 64 each allow a particular gain to be set therein by a gain set signal 69 or 71, respectively. In the illustrative embodiment, a higher and a lower gain are assumed to be set in the GCAs 62 and 64, respectively. For example, when photosensitivity corresponding to ISO 200 or 400 is set on the digital camera 10, gain of 2 or 4 is set in the GCA 62 and gain of 1 is set in the other GCA 64, respectively, although gains to be set in the GCA 62 and 64 are open to choice.

In the CDS/GCA 58, switches 72 and 74 are switched by a gain switch signal 70 output from the timing generator 24, so that a signal 262 amplified with either one of gains of GCA 62 or 64 is input to the CLP 66. In the illustrative embodiment, the signal 262 is amplified by two or four times when the gain of 2 or 4 set in the GCA 62 is selected, or by one time when the gain of 1 set in the GCA 64 is selected. Such a selective amplification of a signal charge with selected one of two different gains is one of characteristic features of the present invention.

By using the fact that the signal 262 amplified with a selected gain has periodicity, the CLP 66 reproduces a DC component for thereby canceling low-frequency noise. Clamp pulses 76 identical in repetition period with the horizontal synchronizing signal are fed from the timing generator 24 to the CLP 66. A signal 78 so processed by the CLP 66 is fed to an ADC (Analog-to-Digital Converter) 80, FIG. 1B. The ADC 80 converts the analog input signal 78 to a digital signal 84 in response to conversion clock pulses 82. The digital signal 84 is delivered from the ADC 80 to a signal processor 86.

Figure 5:
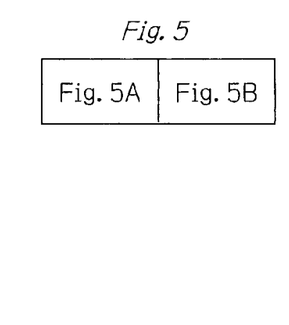
Figure 5A:
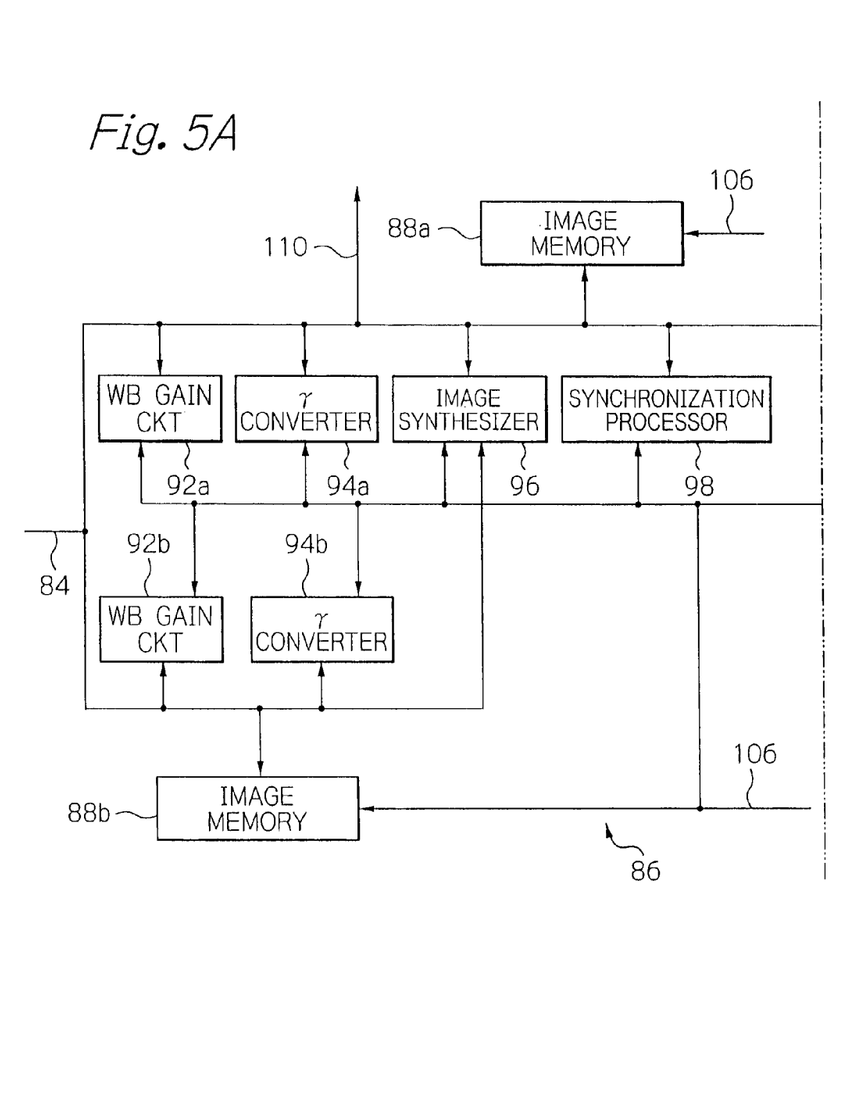
FIGS. 5A and 5B, when combined as shown in FIG. 5, are schematic block diagrams specifically showing the signal processor.
Figure 5B:
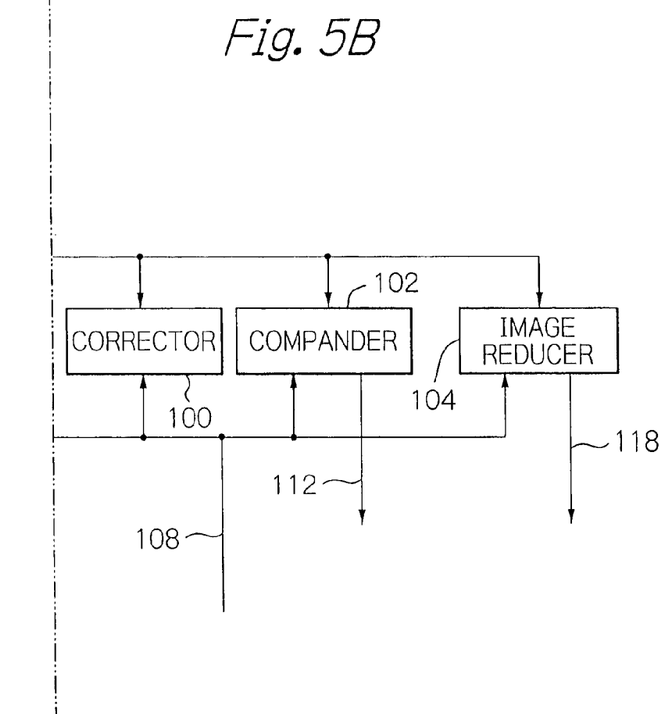

Reference will be made to FIGS. 5A and 5B for describing the signal processor 86 specifically. As shown, the signal processor 86 includes image memories 88a and 88b, the WB gain circuits 92a and 92b mentioned earlier, gamma converters 94a and 94b, an image synthesizer 96, a synchronization processor 98, a corrector 100, a compander 102, and an image reducer 104. These units of the signal processor 86 are controlled by a control signal 106 fed from the CPU 12 in response to a timing signal 108, which is output from the timing generator 24. The timing signal 108 includes the horizontal and vertical synchronizing signals and operation clocks meant for the various units.

The image memories 88a and 88b, implemented as buffer memories, each temporarily store the image data 84 output from the ADC 80. The image data 84 are derived from either one of the main and subregions 34 and 36, or derived only from the main region 34 and processed by either one of the GCAs 62 and 64, FIG. 4. The image data are selectively written to the image memory 88a or 88b in dependence on the nature thereof. In the illustrative embodiment, image data derived from the regions with relatively higher optical sensitivity and data derived from the regions with relatively lower optical sensitivity are, in principle, written to the image memories 88a and 88b, respectively.

The image memory 88a is connected to the WB gain circuit 92a, gamma converter 94a, image synthesizer 96, synchronization processor 98, corrector 100, compander 102, and image reducer 104. The image memory 88b is connected to the WB gain circuit 92b and gamma converter 94b. The imaged at a temporarily stored in the image memories 88a and 88b are respectively fed to the WB gain circuits 92 and 92b in response to a control signal 106.

The WB gain circuits 92a and 92b are adapted to execute WB adjustment and gain correction on the image data fed from the image memories 88a and 88b, respectively. More specifically, the WB gain circuits 92a and 92b each are capable of amplifying the digital image signal with gain for WB adjustment. For example, gain of 4 can be set in the WB gain circuit 92a for amplifying by four times the digital image data stored in the memory 88a, and gain of 1 can be set in the WB gain circuit 92b for amplifying by one time the digital image data stored in the memory 88b. The WB gain circuits 92a and 92b output the resulting digital image data to the gamma converters 94a and 94b, respectively, under the control of the CPU 12.

The gamma converters 94a and 94b each may include a lookup table for gamma correction and is adapted to execute gamma correction on the input image data by use of the lookup table. The gamma converters 94a and 94b output the image data thus subjected to gamma correction to either one of the image synthesizer 96 and synchronization processor 98 in response to a control signal 106. The gamma converter 94a delivers the corrected image data to the CPU 12 as image data 110 while the gamma converter 94b delivers the corrected image data to the image synthesizer 96 in response to a control signal 106.

The image synthesizer 96 is adapted to combine the image data input thereto for each photodiode 32. For example, when image data derived from the main and subregions 34 and 36 of a given photodiode 32 are respectively stored in the image memories 88a and 88b, the image synthesizer 96 combines the two kinds of image data for thereby broadening the dynamic range. The synthesized image data are fed from the image synthesizer 96 to the synchronization processor 98.

The synchronization processor 98 is adapted to execute pixel interpolation and color interpolation on the synthesized image data. More specifically, the synchronization processor 98 interpolates virtual pixels, i.e. vacant portions where the photodiodes 32 are absent due to the pixel shift pattern of the photodiodes 32. The interpolated or planar image data are fed from the synchronization processor 98 to the corrector 100.

The corrector is adapted to execute various kinds of correction, including color-difference matrix processing, contour enhancement and gain adjustment, on the basis of the planar three-color image data and delivers the so corrected image data to the compander 102.

The compander 102 is adapted to compress the image data, which may be fed thereto in the camera mode or the movie mode, in accordance with JPEG (Joint Photographic coding Experts Group) standards or MPEG (Moving Picture coding Experts Group)-1 or -2 standards. The resulting compressed image data, labeled 112, are fed and written to a recording media 114 shown in FIG. 1B. Also, the compander 102 is capable of expanding the compressed image read out from the medium 114. Expansion is inverse in procedure to compression.

The image reducer 104 is adapted to thin out the input image data in accordance with the size and display format of a monitor 116 shown in FIG. 1B and feeds the image data so thinned out to the monitor 116.

The CPU 12, FIG. 1B, includes an estimated luminance distribution calculator (EST. LUMIN. DIST. CAL.) 120 configured to calculate an estimated photometric value (integrated value) by estimating a luminance distribution on the basis of the input image data 110. The calculator 120 then compares the estimated photometric value with a preselected reference value to thereby determine whether or not to broaden the dynamic range and select, if the dynamic range should be broadened, a method of reading out signal charges from the image sensor 22.

Why the CPU 12 determines whether or not to broaden the dynamic range is that if the dynamic range is unconditionally broadened even when sufficient highlight information is not included in a scene, then a tone of a resultant image will be too soft. The determination may, for the simplest way, depend on whether or not more than a preselected number of image data having luminance above a preselected value are detected. Of course, any other method may be used for the determination.

The CPU 12, which has determined to broaden the dynamic range, selects a method of reading out image data from the image sensor 22. The method to be selected is one of a first method that reads out image data of the main and subregions 34 and 36 of a photodiode 32 separately, a second method that reads out only the image data of the main region 34, and a third method that reads out the image data of both of the main and subregions 24 and 36 while mixing them together.

More specifically, the first method combines the image data read out from the main and subregions 34 and 36 separately by taking a period of time corresponding to two fields of image data, thereby broadening the dynamic range. On the other hand, the second and third methods each read out image data by taking a period of time corresponding to a single field, amplifies the image data with different gains to thereby produce two kinds of image data, and combines the two kinds of image data for thereby broadening the dynamic range.

The reason why one of the first to third methods is further selected when broadening the dynamic range is because the broad dynamic range available with the main and subregions 34 and 36 read separately can often be covered only by the information derived from the main region 34, depending on ISO photosensitivity selected on the digital camera 10 and the luminance distribution of a scene. For example, under ISO 400, the main region 34 can store only by itself information four times more than that under ISO 100. Therefore, under ISO 400, as far as the luminance distribution of a scene is not so wide, it is more efficient to read out the image data only of the main region 43 over the period of time corresponding to a single field than to read out the image data of the main and subregions 34 and 36 separately over the period of time corresponding to two fields. Alternatively, the image data of the main and subregions 34 and 36 may be read out while being mixed together. This alternative scheme not only completes image reading in the period of time corresponding to a single field, too, but also increases the final S/N ratio, compared to the method that reads out the image data only of the main region 34.

Subsequently, the CPU 12 feeds gain set signals 69 and 71 to the CDS/GCA 58 in accordance with the reading method thus selected and feeds a control signal 73 to the timing generator 24. In response, the timing generator 24 feeds a gain switch signal 70 to the CDS/GCA 58. For example, to read the image data of the main and subregions 34 and 36 separately under ISO 200, gains of 2 and 1 are respectively set in the GCAs 62 and 64, FIG. 4, for amplifying the image data derived from the main and subregions 34 and 36, respectively. Even when only the image data of the main region 34 should be read out, the above gains are also set in the GCAs 62 and 64, but the gain switch signal 70 switches the switches 72 and 74 at high-speed to thereby produce two kinds of image data amplified with gains of 2 and 1. Further, when the image data of the main and subregions 34 and 36 should be read out while being mixed together, a gain smaller than 2 may be assigned to the GCA 62 because the output voltage is high. Thus an image with high S/N ratio i.e. with less noise is obtained.

Figure 6:
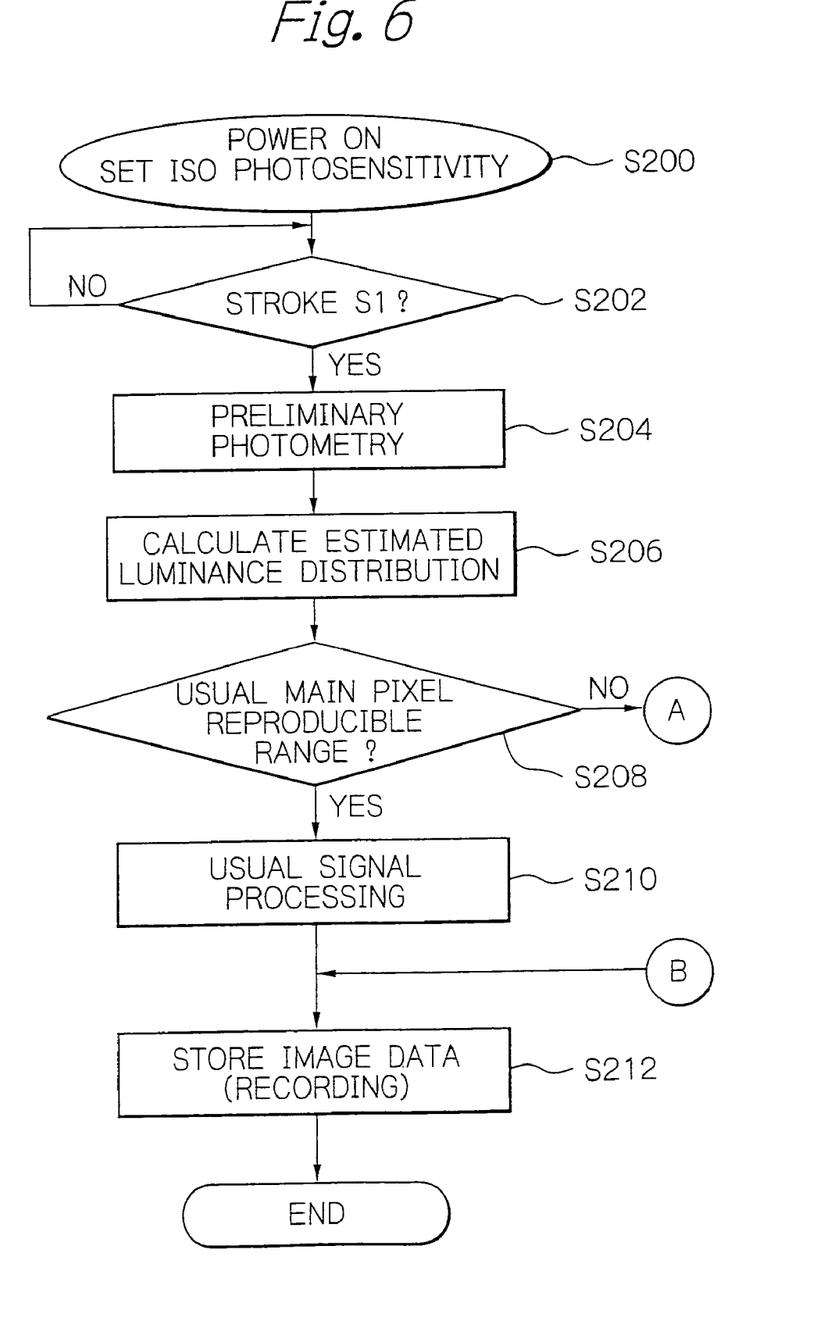
FIG. 6 is a flowchart demonstrating a former half of a specific operation of the illustrative embodiment.

A specific operation of the illustrative embodiment will be described with reference to FIGS. 6 and 7 and FIGS. 9A through 9I. FIG. 6 shows a former half of a procedure unique to the illustrative embodiment while FIGS. 7 and 8 each show a particular latter half following the former half. First, as shown in FIG. 6, on the power-up of the camera 10, an ISO photosensitivity signal 15 representative of ISO photosensitivity selected by preselected one of the keys 14 is sent from the key to the CPU 12 (step S200). Assume that ISO 400 higher than usual ISO 100 is set to the main region 34 by way of example. In response to the ISO photosensitivity signal 15, the CPU 12 delivers gain set signals 69 and 71 to the GCAs 62 and 64, respectively, thereby setting gains of 4 and 1 in the GCAs 62 and 64, respectively.

Subsequently, the CPU 12 repeatedly determines whether or not the operator has depressed the shutter release key included in the keys 14 in its first stroke S1 (step S202). If the answer of the step S202 is positive (YES), then the CPU 12 establishes the preliminary photometry mode (step S204). In the step S204, the optics 16 performs AE and AF. The resulting preliminary photometric data obtained via the optics 16 and image sensor 22 are routed through, e.g. the GCA 64 of the CDS/GCA 58 with gain of 1 to the ADC 80 to be digitized thereby and then temporarily written to, e.g. the image memory 88a of the signal processor 86. The preliminary photometric data are adjusted in WB and gain by the WB gain circuit 92a, subjected to gamma correction by the gamma converter 94a, and then input to the estimated luminance distribution calculator 120 of the CPU 12 as a signal 110.

The calculator 120 calculates an estimated luminance distribution value (step S206). Because ISO 400 is set in this specific case, the calculator 120 determines whether a scene can be reproduced within the main pixel reproducible range 52 or the dynamic range must be broadened (step S208). If the answer of the step S208 is YES, meaning that the dynamic range does not have to be broadened, the camera 10 actually picks up the scene as soon as the operator depresses the shutter release key in its second stoke S2, and executes usual signal processing (step S210). More specifically, image data with the reproducible range 52 are routed through the GCA 64 with gain of 1 to the signal processor 86 to be subjected to various kinds of processing and then written to the recording medium 114 (step S212).

Figure 7:
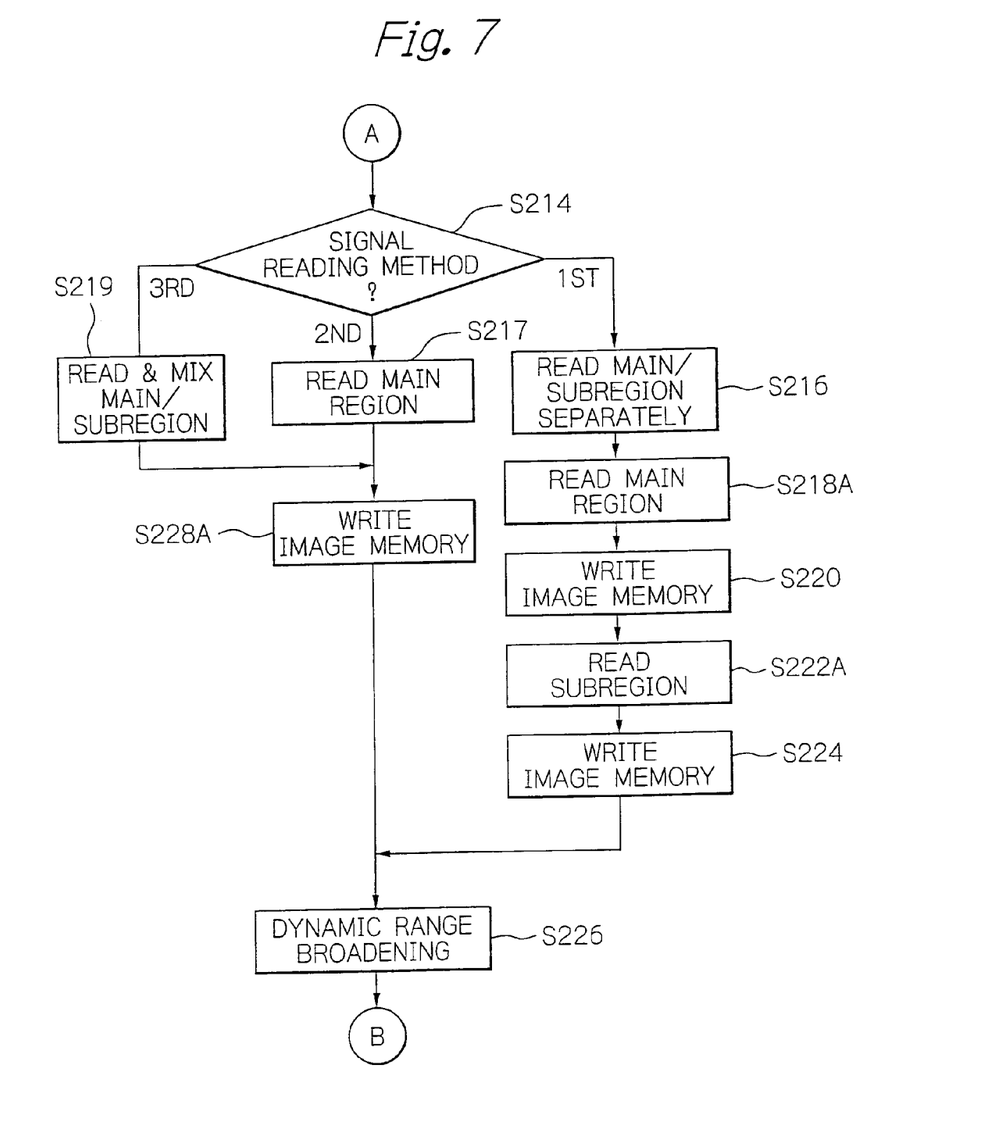
FIG. 7 is a flowchart demonstrating a latter half of the same specific operation.

If the answer of the step S208 is NO, meaning that the dynamic range must be broadened, then the step S208 is followed by a step 214 shown in FIG. 7 via a connector A. In the step S214, the calculator 120 determines whether or not the reproducible range 52 of the main region 34 and the reproducible range 40 of the same region 34, but containing 400% more luminance information than the reproducible range 52, can reproduce the scene. If the scene cannot be reproduced even by a combination of the two reproducible ranges 52 and 40, then the calculator 120 selects the first reading method (step S216) or the third reading method (step S219). If the two reproducible ranges 52 and 40 are sufficient for reproduction, then the calculator 120 selects the second reading method (step S217).

If the scene cannot be reproduced even when the dynamic range is broadened by four times, the calculator 120 selects one of the first and third reading methods by the following procedure (step S214) When the third reading method that reads the signal charges of the main and subregions 34 and 36 while mixing them together is selected, the saturation level 38 (400 mV) of the main region 34 and the saturation level 48 (100 mV) of the subregion 36, shown in FIG. 3, are added to guarantee a saturation level of 500 mV. The saturation level of 500 mV allows the dynamic range to be broadened by more than four times; if the broadened dynamic range is sufficient for reproduction, then the third reading method is selected (step S219). If even the saturation level of 500 mV is not sufficient, then the first method that allows the dynamic range to be broadened by sixteen times is selected (step S216).

As for the first reading method, the image data of the main region 34 is read out (step S218A) and then written to the image memory 88a via the GCA 64 with gain of 1 (step S220). Subsequently, the image data of the subregion 36 is read out (step S222A) and then written to the image memory 88b via the same GCA 64 (step S224). At this instant, the signal processor 86 executes gain adjustment and other processing on the digitized image data. Thereafter, the image synthesizer 96 combines the image data of the main and subregions 34 and 36 for thereby broadening the dynamic range (step S226).

As for the second reading method, only the signal charge of the main region 34 of the photodiode 21, whose incident light is reduced, is read out (step S217). The signal charge, which is analog data, is not amplified via the GCA 64 with gain of 1, digitized and then written to both of the two image memories 88a and 88b (step S228A). In this case, because the four times broader dynamic range must be guaranteed within the main pixel reproducible range 40, the same digitized image data is amplified with different gains by the WB gain circuits 92a and 92b and then combined by the image synthesizer 96 to thereby broaden the dynamic range (step S226). More specifically, the digital image data stored in the image memory 88b is amplified with gain of 4 and then combined with the image data stored in the image memory 88b. In this manner, the dynamic range of the image sensor 22 is broadened by using only the main regions 34 of the image sensor 22.

As for the third reading method, the signal charges of the main and subregions 34 and 36 are read out while being mixed together (step S219). This is followed by the same steps as in the second reading method. The difference is, in the third reading method, that the output voltage level i.e. photosensitivity is higher than that of the second method and therefore allows gain of the subsequent step S226 to be reduced. Accordingly, an image with a high S/N ratio, i.e. containing less noise is obtained.

Figure 8:
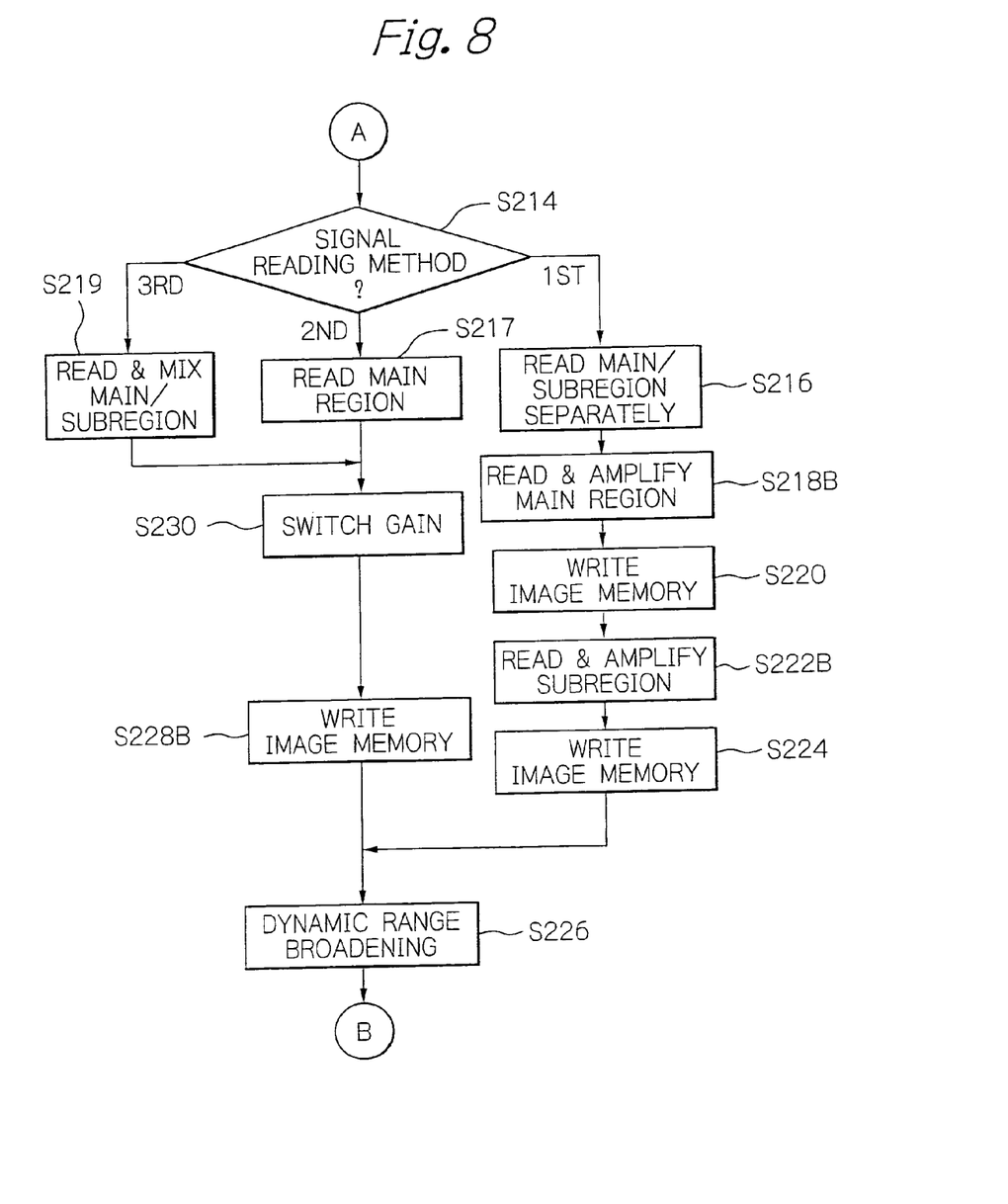
FIG. 8 is a flowchart showing an alternative procedure of the latter half following the former half.

The alternative latter half of the procedure shown in FIG. 8 is the same as the latter half of FIG. 7 except that it amplifies the image data before digitization. More specifically, as shown in FIG. 8, when the image data of the main region 34 is read out by the first method, the image data is amplified by the GCA 62 with gain of 4 at the analog stage (step S218B). On the other hand, when the image data of the subregion 36 is read out, the GCA 64 with gain of 1 is selected. By so amplifying the imaged at a at the analog stage, it is possible to obviate that even digitizing quantization errors are amplified due to gain adjustment after digitization. The procedure of FIG. 8 therefore reduces the noise of the resulting image more than the procedure of FIG. 7.

Figure 9A:
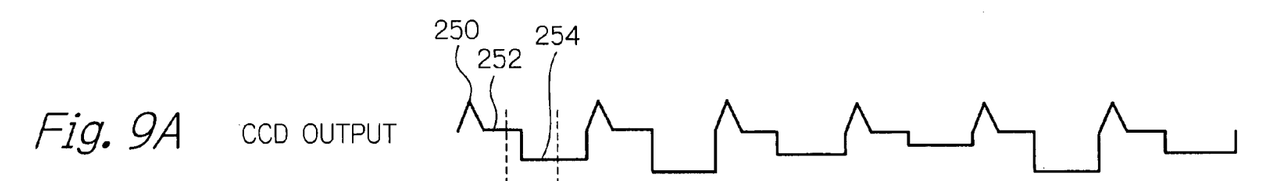
FIGS. 9A through 9I are timing charts showing various signals appearing when one of different image data reading methods included in the procedure of FIG. 8 is practiced.
Figure 9B:
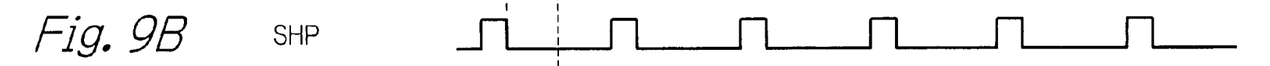
Figure 9C:
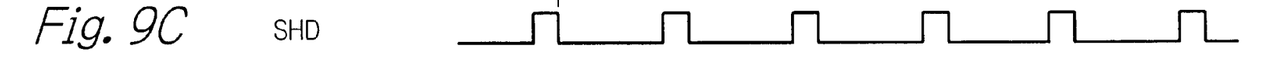

FIGS. 9A through 9I are timing charts showing various signals to appear when the second reading method of FIG. 8 (step S217) is executed by gain switching. More specifically, FIG. 9A shows analog pixel data (CCD OUTPUT) derived from the main regions 34 of the CCD image sensor 22. In FIG. 9A, a signal waveform representative of a single pixel consists of a reset period 250, a field-through level 252 and a signal level 254. FIGS. 9B and 9C respectively show the sample and hold signals SHP and SHD used to respectively execute CDS on the field-through level 252 and signal level 254 representative of a single pixel, thereby reducing noise.

Figures 9D, 9E, 9F:
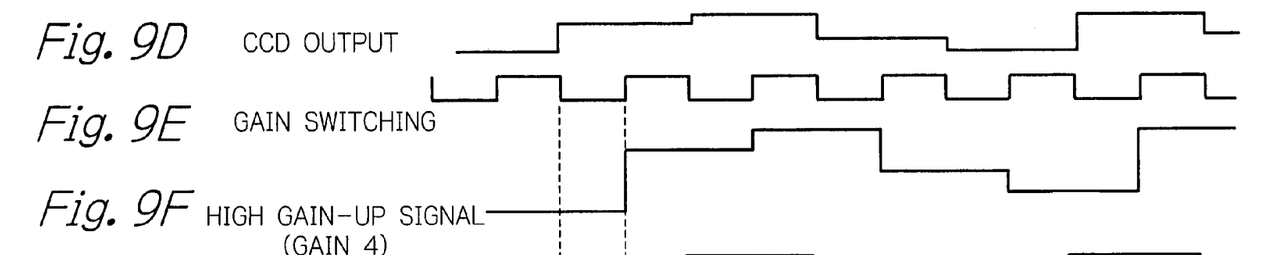

FIG. 9D shows an output (CDS OUTPUT), which is the signal 256 shown in FIG. 4, produced by subjecting the signal levels 254 produced by the sample and hold signal SHD to differential inversion. FIG. 9E (GAIN SWITCHING) shows the waveform of the gain switch signal 70, FIG. 4, and indicative of the timing at which the switches 72 and 74 are switched. More specifically, the GCA 62 with gain of 4 or the GCA 64 with gain of 1 is selected when the gain switch signal 70 is in a high level or in a low level, respectively.

Figures 9G, 9H, 9I:
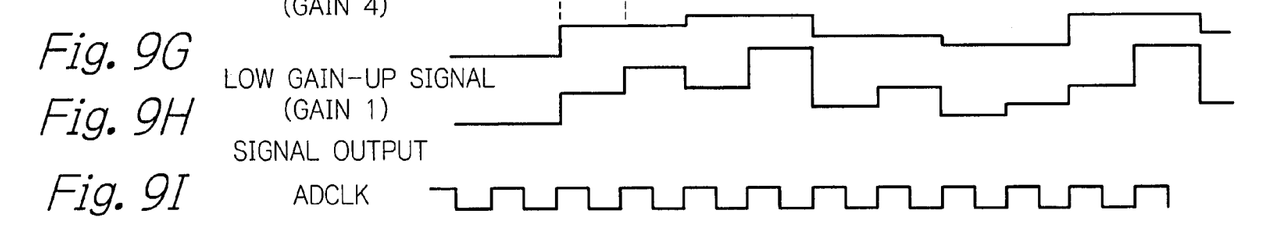

As FIGS. 9D and 9E indicate, the gain switch signal is caused to go high and low for each CDS output level corresponding to a single pixel. As a result, signals amplified with different gains of the GCAs 62 and 64 are produced, as shown in FIGS. 9F and 9G, respectively. The signals of FIGS. 9F and 9G correspond to the signals 258 and 260 shown in FIG. 4, respectively.

More specifically, FIG. 9F shows a signal (HIGH GAIN-UP SIGNAL) produced by the GCA 62 with gain of 4, i.e. four times amplified while FIG. 9G shows a signal (LOW GAIN-UP SIGNAL) produced by the GCA 64 with gain of 1. Because the switch 74 is operated by the same switching signal 70 as the switch 72 in synchronism, the output signal 262, FIG. 4, is provided with a waveform shown in FIG. 9H. Consequently, two kinds of signal 262 amplified with two different gains are produced from the CDS output of FIG. 9D corresponding to each single pixel.

As stated above, the procedure of FIG. 7 reads the image data only of the main region 34, and writes substantially the same image data in the image memories 88a and 88b without amplifying the image data at the analog stage. By contrast, the procedure of FIG. 8 amplifies the image data with two different gains at the analog stage and thereby reduces the noise of an image more than the procedure of FIG. 8. The analog signals, each being so amplified by particular gain, are output via the clamper 66 as a signal 78 and then digitized by the ADC 80 in accordance with an ADC clock (ADCL) shown in FIG. 9I (step S228B).

In the procedure of FIG. 8, the four times broader dynamic range is guaranteed within the main pixel reproducible range 40 by the amplification with gain performed at the analog stage. Therefore, after digitization, the WB gain circuits 92a and 92b should only perform gain adjustment for WB, i.e. it is not necessary to perform additional amplification for broadening the dynamic range. Thereafter, the high and low gain-up signals are combined by the image synthesizer 96 as well as the procedure of FIG. 7, so that the dynamic range is broadened (step S226).

As for the third reading method selected FIG. 8 (step S219), the method reads out the signal charges from the main and subregions 34 and 36 while mixing them together, as well as the step S219 of FIG. 7. After that, a step S230 and successive steps are executed substantially in the same manner as the second reading method. The difference is that the third reading method increases the output voltage and thereby photosensitivity. Therefore, the third method can reduce gain to be used at the analog stage in the step S230, thereby obtaining an image containing less noise.

In the illustrative embodiment, considering the influence of a decrease in the amount of saturation ascribable to thermal diffusion, it is desirable to sequentially read the image data of the main and subregions 34 and 36 in this order, although not shown or described specifically.

In summary, in accordance with the present embodiment, when the luminance distribution of a desired scene is small, signal charges are not read out from subregions, but read out only of the main regions of photodiodes, guaranteeing a broad dynamic range. This dynamic range is as broad as one achievable when signal charges are read out from both of the main and subregions separately. Reading out signal charges from both of the main and subregions while mixing them together is successful to further increase photosensitivity and an S/N ratio. Further, in any one of different reading methods available with the present invention, the S/N ratio can also be increased when two different gains are applied to the analog stage.

Moreover, the present embodiment reduces a reading time to thereby realize high-speed continuous shots and save power, compared to the case wherein image data are read out from the main and subregions separately and sequentially. In addition, when only the image data of the main regions are read out, it is possible to obviate the influence of shading ascribable to the subregions.

The entire disclosure of Japanese patent application No. 2002-285852 filed on Sep. 30, 2002, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of broadening a dynamic range of a solid-state image sensor including photosensitive cells, each being made up of a main region and a subregion respectively provided with higher and lower photosensitivity, and allowing signal charges to be read out from the main region and the subregion separately, comprising the steps of:

reducing a quantity of light to be incident on each photosensitive cell;

reading out a signal charge from the main region of the photosensitive cell under a reduced quantity of incident light;

amplifying, at an analog stage, the signal charge read out with different gains to thereby generate a high gain-up signal and a low gain-up signal;

digitizing the high gain-up signal and the low gain-up signal; and combining the high gain-up signal with the low gain-up signal digitized;

whereby the dynamic range of the solid-state image sensor is broadened by use only of the main region.

2. The method in accordance with claim 1, wherein said step of reducing the quantity of light comprises a substep of reducing a shutter speed of the solid-state image sensor.

3. The method in accordance with claim 1, wherein said step of reducing the quantity of light comprises a substep of varying an F number of the solid-state image sensor.

4. The method in accordance with claim 1, wherein said step of reading the signal charge comprises a substep of reading the signal charges of the main region and the subregion while mixing the signal charges together.

* * * * *